US008001313B2

(12) United States Patent
Eggers et al.

(10) Patent No.: US 8,001,313 B2
(45) Date of Patent: Aug. 16, 2011

(54) INSERTION AND REMOVAL OF COMPUTING CARDS IN SERVER I/O SLOTS

(75) Inventors: Robert J. Eggers, Austin, TX (US); Natalie A. Hawes, Round Rock, TX (US); Orlando O.Neill, Austin, TX (US); Brian P. Sobocinski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 12/274,381

(22) Filed: Nov. 20, 2008

(65) Prior Publication Data

US 2010/0125691 A1 May 20, 2010

(51) Int. Cl.
*G06F 13/00* (2006.01)
(52) U.S. Cl. ........................................................ 710/302
(58) Field of Classification Search .......... 710/300–317; 713/300–340
See application file for complete search history.

(56) References Cited

U.S. PATENT DOCUMENTS

| | | | | |
|---|---|---|---|---|
| 5,617,081 | A * | 4/1997 | Madnick et al. | 710/302 |
| 6,041,375 | A * | 3/2000 | Bass et al. | 710/302 |
| 6,263,387 | B1 | 7/2001 | Chrabaszcz | |
| 6,286,066 | B1 | 9/2001 | Hayes et al. | |
| 6,295,566 | B1 | 9/2001 | Stufflebeam | |
| 6,311,242 | B1 * | 10/2001 | Falkenburg et al. | 710/301 |
| 6,338,107 | B1 | 1/2002 | Neal et al. | |
| 6,535,944 | B1 | 3/2003 | Johari et al. | |
| 6,591,324 | B1 * | 7/2003 | Chen et al. | 710/302 |
| 6,754,817 | B2 * | 6/2004 | Khatri et al. | 713/1 |
| 6,801,973 | B2 * | 10/2004 | Wu | 710/301 |
| 6,883,125 | B2 * | 4/2005 | Abbondanzio et al. | 714/100 |
| 6,910,142 | B2 | 6/2005 | Cross et al. | |
| 6,954,813 | B2 | 10/2005 | Holly, III et al. | |
| 6,961,795 | B2 * | 11/2005 | Erickson et al. | 710/302 |
| 6,968,414 | B2 * | 11/2005 | Abbondanzio et al. | 710/301 |
| 7,076,591 | B2 * | 7/2006 | Arramreddy | 710/302 |
| 7,191,347 | B2 * | 3/2007 | Bigelow et al. | 713/300 |
| 7,200,694 | B2 * | 4/2007 | Yakovlev et al. | 710/48 |
| 7,263,569 | B1 * | 8/2007 | Sardella et al. | 710/302 |
| 7,263,620 | B2 * | 8/2007 | Bresniker et al. | 713/300 |
| 7,558,973 | B2 * | 7/2009 | Huang | 713/300 |
| 2003/0070066 | A1 | 4/2003 | Cross et al. | |
| 2004/0027006 | A1 | 2/2004 | Kuroiwa | |
| 2005/0235083 | A1 | 10/2005 | Tsushima et al. | |
| 2006/0005055 | A1 * | 1/2006 | Potega | 713/300 |
| 2007/0136504 | A1 | 6/2007 | Wu | |
| 2007/0271403 | A1 * | 11/2007 | Kojori | 710/302 |
| 2008/0016375 | A1 * | 1/2008 | Huang | 713/300 |
| 2009/0307514 | A1 * | 12/2009 | Roberts et al. | 713/330 |

\* cited by examiner

*Primary Examiner* — Raymond N Phan
(74) *Attorney, Agent, or Firm* — Libby Z. Taub; Gregory K Goshorn; Greg Goshorn, P.C.

(57) ABSTRACT

A switch is provided that detects when a computer expansion card has been added, removed or changed. During operation, the switch is held in a depressed position by contact with a card. If the card is removed, the switch is raised and, when a second card is installed in the same slot, the switch is again depressed. The depression of the switch triggers a change signal that initiates the introduction of power to the slot for a period of time long enough for the hypervisor to detect the new device. A delay between a release and subsequent depression of the switch is measured such that when the switch is released enough time is provided to firmly seat a different card in the planar device. Following the delay, power is supplied to the slot so that the hypervisor detects the card and updates the current configuration parameters.

28 Claims, 6 Drawing Sheets

INSERTION AND REMOVAL OF COMPUTING CARDS IN SERVER I/O SLOTS

BACKGROUND

1. Technical Field

The claimed subject matter relates generally to computer expansion devices and, more specifically, to a method to facilitate the installation or swapping of an expansion card in a computing system

2. Description of the Related Art

The last several decades have witnessed incredible progress in the development of systems and procedures for the modularization of computer devices. The original computers were large, stand-alone machines in which every associated peripheral device, such as a printer or a communication device, had to be specifically wired to the computing system and the computing system had to be specifically programmed to utilize the device. Eventually, methods were developed to enable peripheral devices to be installed, swapped and uninstalled in a more modular fashion. In addition, devices were developed in the form of expansion cards that plug directly into a computing system. Most personal computer users are familiar with the procedure for adding or changing a printer and/or expansion cards.

Today, most computer systems have physical slots in which certain devices such as memory controllers and network communication devices, i.e. "expansion cards" or simply "cards," can be installed into the hardware. For example, the Peripheral Component Interconnect Standard (PCI) includes specifications for a planar device, i.e. "planar" or "card carrier," that is incorporated into a motherboard and into which expansion cards may be inserted. Expansion cards include, but are not limited to, such devices as network cards, sound cards, video cards, modems, extra ports and disk controllers. Examples of computer bus architectures employed to provide connectivity among expansion cards and the computing system include PCIe, PCI-X, SATA, ISA and SAS.

Expansion cards are frequently installed into positions in the planar, i.e. "slots," when the system is powered down. However, some current systems enable a user to add, remove or change devices while the system is powered and booted to a hypervisor. In this type of system, a subset of the installed hardware assigned to a virtual computing system, i.e. "partition," rather than the entire computing system may be activated and deactivated without turning the system off and on.

One issue that arises when a user installs a new card in this manner is that a hardware management console (HMC) cannot detect configuration changes at the slot level until a partition containing the slot is activated, or power is supplied. For example, when a user who is selecting slots to include in a new partition configures the hardware and software for the new partition, the user uses the HMC to create the new partition. If the user is, for example, replacing a Small Computer System Interface (SCSI) device with an Ethernet adapter, the user cannot see the Ethernet adapter when selecting input/output (I/O) for the partition because the HMC still displays the SCSI adapter as installed in the position that now contains the Ethernet adapter. The user must double check to make sure that the location code for the unexpected SCSI adapter actually matches the slot in which the Ethernet adapter is actually installed. This checking becomes even more problematic if the partition creation step is performed remotely after the hardware is installed. In other words, to ensure that no incorrect devices are installed in the system must be manually checked by a person local to the system.

SUMMARY OF THE CLAIMED SUBJECT MATTER

Provided is a system and method for facilitating the swapping of computer expansion cards that eliminates the need to power a partition containing multiple slots off and on. A switch is provided that detects when an expansion card has been added, removed or changed. During typical operation, the switch is held in a depressed position by physical contact with an installed card and the power state of the partition corresponds to that which a hypervisor dictates. If a card is removed from the planar, the switch is raised and, when a second card is installed in the same slot, the switch is again depressed. The depression of the switch triggers a change signal that initiates the introduction of power to the slot for a period of time long enough for the hypervisor to detect the new card. The switch may be any type of commonly available switch, including but not limited to, a mechanical, optical or pressure switch. In the alternative, the change signal is triggered by logical presence detect pins associated with an I/O bus. Thus, rather than a switch actuated by the removal and insertion of a card, a presence detect function of the I/O bus generates the change notification signal.

A time delay between a release and subsequent depression of the switch is measured such that when the switch is released, i.e. a card is removed from the planar, a user is provided enough time to insert a different card firmly in the planar. Following the delay, power is supplied to the slot, the hypervisor detects the card and updates the current configuration parameters and, then the slot is powered down to the level dictated by the hypervisor, typically a powered down state consistent with the card insertion mode. In this manner, the hypervisor is able to provide up-to-date information on a system including all devices currently installed in any particular planar device, regardless of when in the installation process the information is requested. This is particularly important when a system administrator is not located at the same site as the computer system.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures, in which:

DETAILED DESCRIPTION OF THE FIGURES

Although described with particular reference to a Peripheral Component Interconnect Standard (PCI), the claimed subject matter can be implemented in any information technology (IT) architecture in which the hot swapping of computer peripheral devices is desirable. Those with skill in the computing arts will recognize that the disclosed embodiments have relevance to a wide variety of computing environments in addition to those described below. In addition, the methods of the disclosed technology can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any physical means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for the configuration of a peripheral device in a computing system. The term "programmed method", as used herein, is defined to mean one or more process steps that are presently performed; or, alternatively, one or more process steps that are enabled to be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
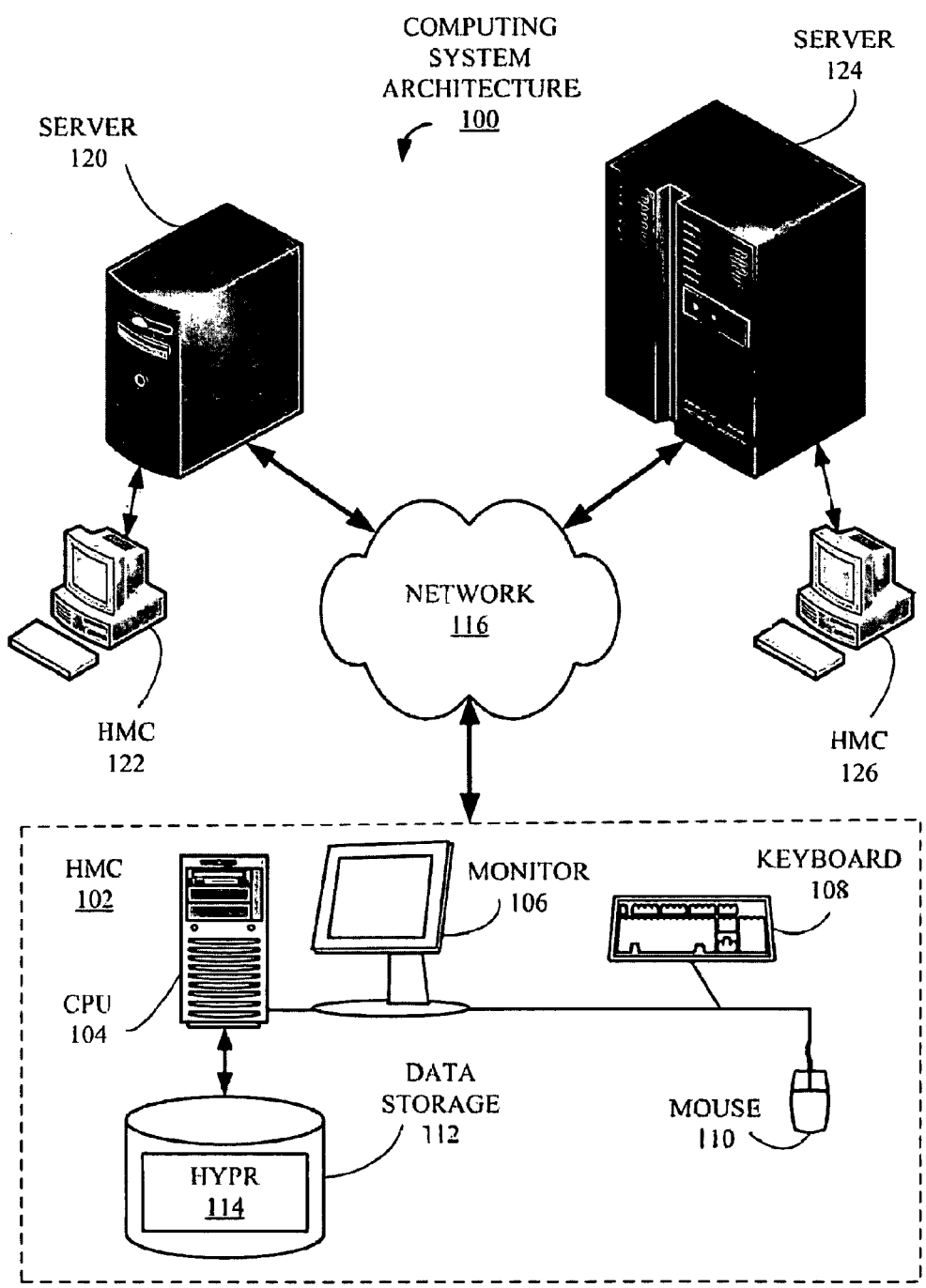
FIG. 1 is a block diagram of one example of a computing architecture that incorporates the claimed subject matter.

FIG. 1 is a block diagram of one example of a computing system architecture 100 that incorporates the claimed subject matter. Architecture includes a hardware management console (HMC) 102. HMC 102 includes a includes a central processing unit (CPU) 104 coupled to a monitor 106, a keyboard 108 and a mouse 110, which together facilitate human interaction with HMC 102 and other elements of client system architecture 100.

Also included in HMC 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing a hypervisor (HYPR) 114 that implements aspects of the claimed subject matter, including maintenance of tables and registries of system contents. Various examples of processing associated with hypervisor 114 are described in more detail below in conjunction with FIGS. 2-6.

HMC 102 is communicatively coupled to a network 116, which is also connected to a server computer 120 and a server computer 124. Network 116 can represent any number of communication mediums such as, but not limited to, a local area network (LAN), a wide area network (WAN), the Internet, a public switched telephone system or simply direct connections between different computing systems. In this example, server 120 is a data server and server 124 is a mainframe computer although the disclosed technology is applicable to practically any type of computing system, either current or yet to be developed.

Servers 120 and 124 are coupled to an HMC 122 and a HMC 126, respectively. Although not shown for the sake of simplicity, servers 120 and 124 and HMCs 122 and 126 would also typically each include at least one CPU, a monitor, a keyboard, a mouse, data storage and components 104, 106, 108, 110, 112 and 114. It should also be noted there are many possible computing system architecture configurations, including many different types of devices and that computing system architecture 100 is merely one simple example.

Figure 2:
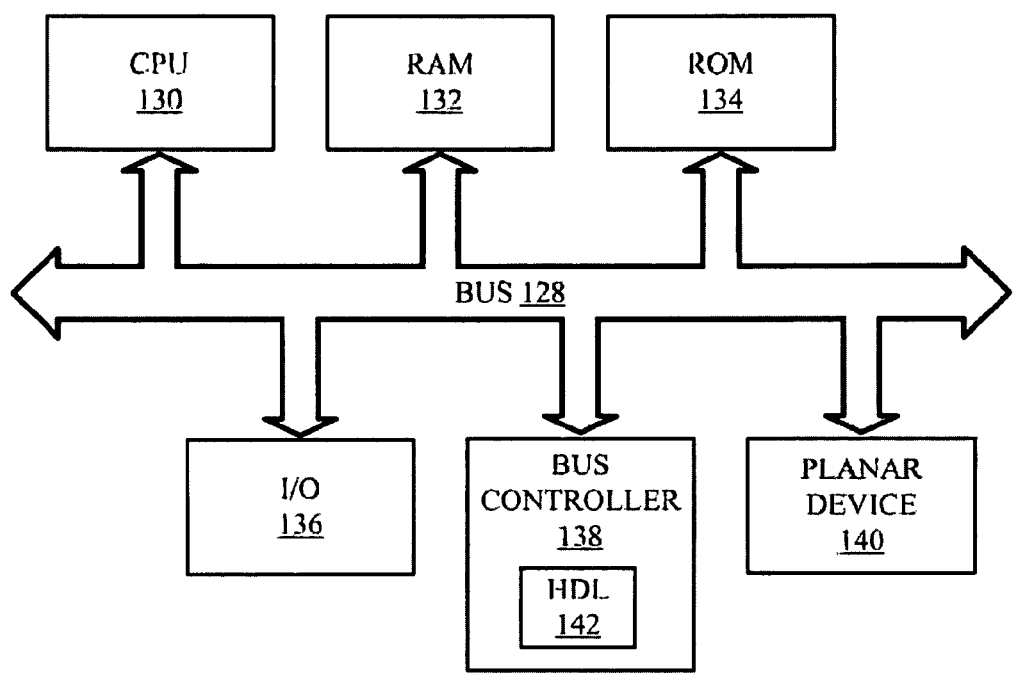
FIG. 2 is a block diagram of a system bus and various components of a server introduced in conjunction with FIG. 1.

FIG. 2 is a block diagram of a system data bus 128 of server 120 (FIG. 1) and examples of various components that might be coupled to bus 128. In this example, components include a CPU 130, a random access memory (RAM) 132, a read only memory (ROM) 134, an I/O module 136, a bus controller 138 and planar device, or "planar," 140. Components 130, 132, 134, 136, 138 and 140 are examples of the type of components that may be coupled to bus 128. It should be noted that a typical computer bus might have other components not illustrated in FIG. 2 and that components 130, 132, 134, 136, 138 and 140 are used for the purposes of illustration. CPU 130, RAM 132, ROM 134, I/O 136, bus controller 138 and planar, or "card carrier," 140 should be familiar to those with skill in the computing arts. Bus controller 138 also includes a hardware detection logic (HDL) 142 that is employed to implement one embodiment of the claimed subject matter. HDL 142 employs logic presence detect pins of bus 128 to detect a change in cards inserted into planar 140. HDL 142 is described in more detail below in conjunction with FIG. 6

Figure 3:
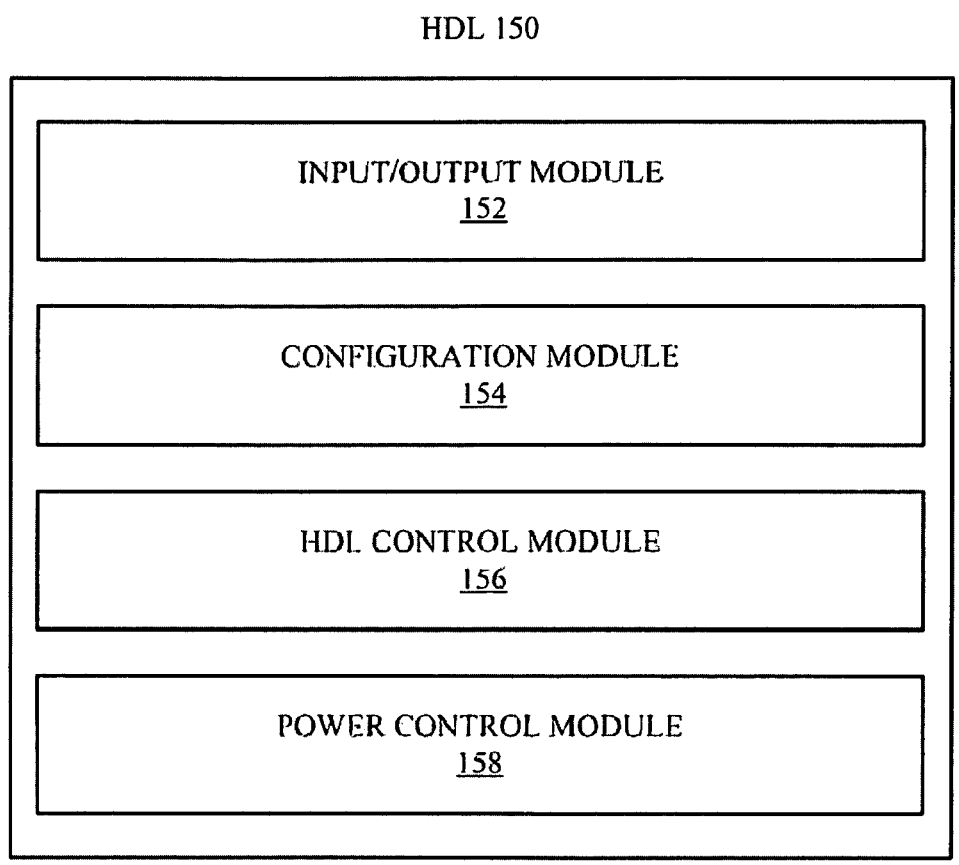
FIG. 3 is a block diagram of a hardware detection logic module employed in one or more embodiments of the claimed subject matter.

FIG. 3 is a block diagram of a hardware detection logic module (HDL) 150 employed in one or more embodiments of the claimed subject matter. In the following description, HDL 150 could be employed in conjunction with a planar device 160 (see FIG. 4) and a planar device 180 (see FIG. 5). In this example, HDL 150 is logic incorporated into planar 160. HDL 150 includes an Input/Output (I/O) module 152, a Configuration module 154, an HDL Control module 156 and a power control module 158. It should be understood that the claimed subject matter can be stored and executed in many configurations but, for the sake of simplicity, is described only in terms of planar 160.

I/O module 152 handles any communication between HDL 150 and other components such as, but not limited to, a planar device (see FIGS. 4 and 5), monitored in accordance with the claimed subject matter, and a hypervisor and HMC, such as HYPR 114 and HMCs 102, 122 and 126 (FIG. 1). Configuration module 145 stores data necessary for the setup and operation of HDL 150. Examples include, but are not limited to, information on the system on which HDL 150 is executing and the planar devices that HDL 150 is monitoring.

HDL Control module 156 includes the logic that controls HDL 150. Power control module 158 includes logic for changing power levels associated with planar devices monitored by HDL 150 in accordance with the claimed subject matter. HDL 150 and components 152, 154, 156 and 158 are described in more detail below in conjunction with FIGS. 4-6.

Figure 4:
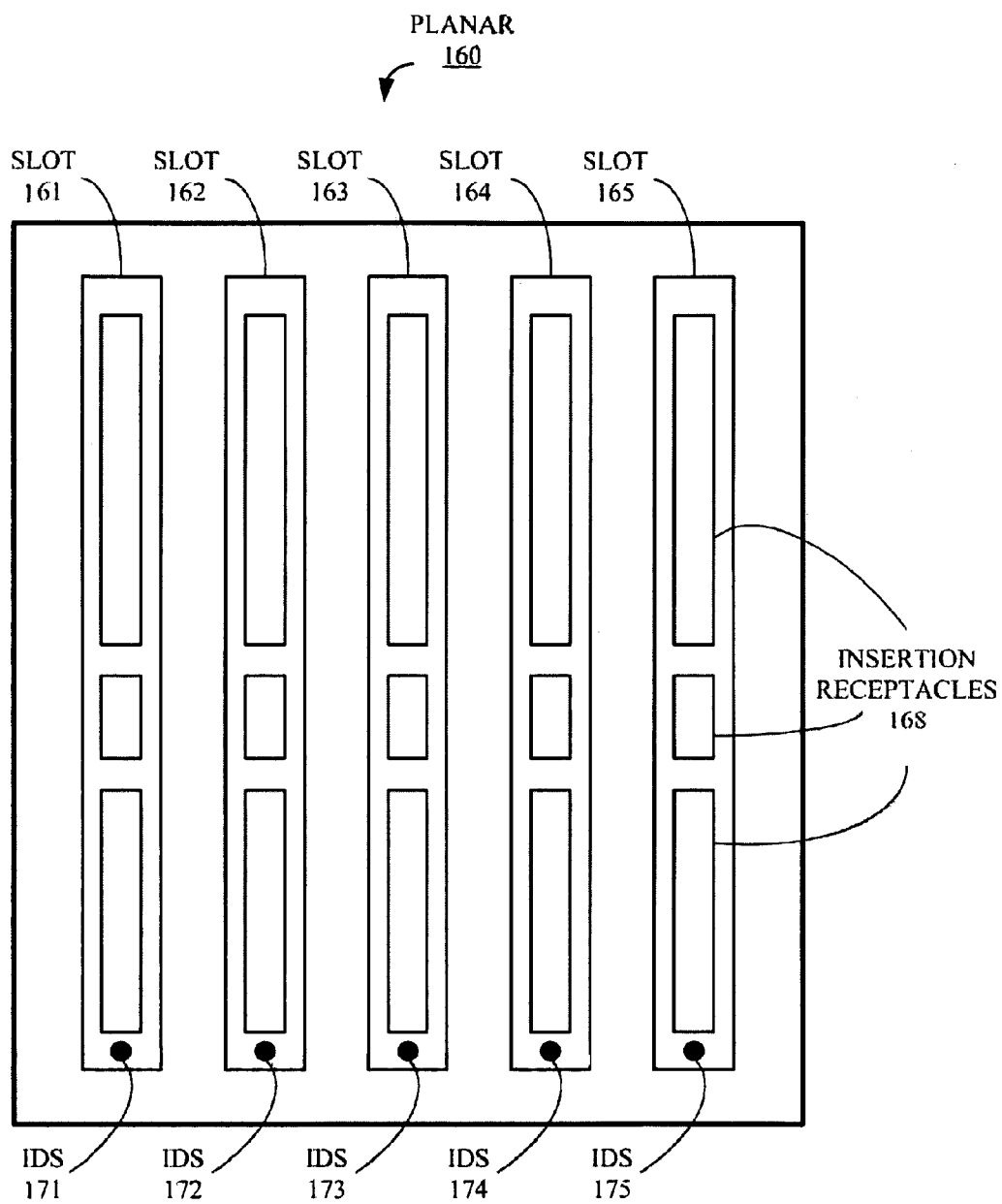
FIG. 4 is a block diagram of a planar device, first introduced in conjunction with FIG. 2, for the installation of expansion cards.

FIG. 4 is a block diagram of a planar 160 that implements a second embodiment of the claimed subject matter. Planar 160 may be installed in any suitable computing system such as server 120 (FIG. 1) or server 124 (FIG. 1). In this example, planar includes five (5) slots 161-165 for insertion of expansion cards (not shown). It should be understood that an actual planar may have more or less than five (5) slots. Each of slots 161-165 has insertion receptacles 168 although for the sake of simplicity only slot 165 is labeled. Typically, expansion cards have tabs on one edge that fit into insertion receptacles 168 that prevents the expansion card from being inserted wrong. Those with skill in the computing arts should be familiar with slots and expansion cards and the manner in which the two fit together.

Positioned upon each slot 161-165 is one of an insertion detection switch (IDS) 171-175, respectively. Although illustrated in a particular position with respect to the respective slots 161-165, each IDS 171-175 may be positioned anywhere in the slot where the insertion of an expansion card would cause the corresponding IDS 171-175 to be depressed. It should be noted that although IDSs 171-175 are described as a "switch," each could be and type of device such as, but not limited to, a sensor or a button that provides the desired functionality. In other words, IDSs 171-175 are any type of device capable of transmitting a signal when an expansion card is inserted into or removed from the corresponding slot. In addition, each of IDSs 171-175 may be queried to determine whether the queried IDS 171-175 is in an depressed or open state to determine whether or not an expansion card is currently inserted into the corresponding slot 161-165. The function of IDSs 171-175 is described in more detail below in conjunction with FIG. 6.

Figure 5:
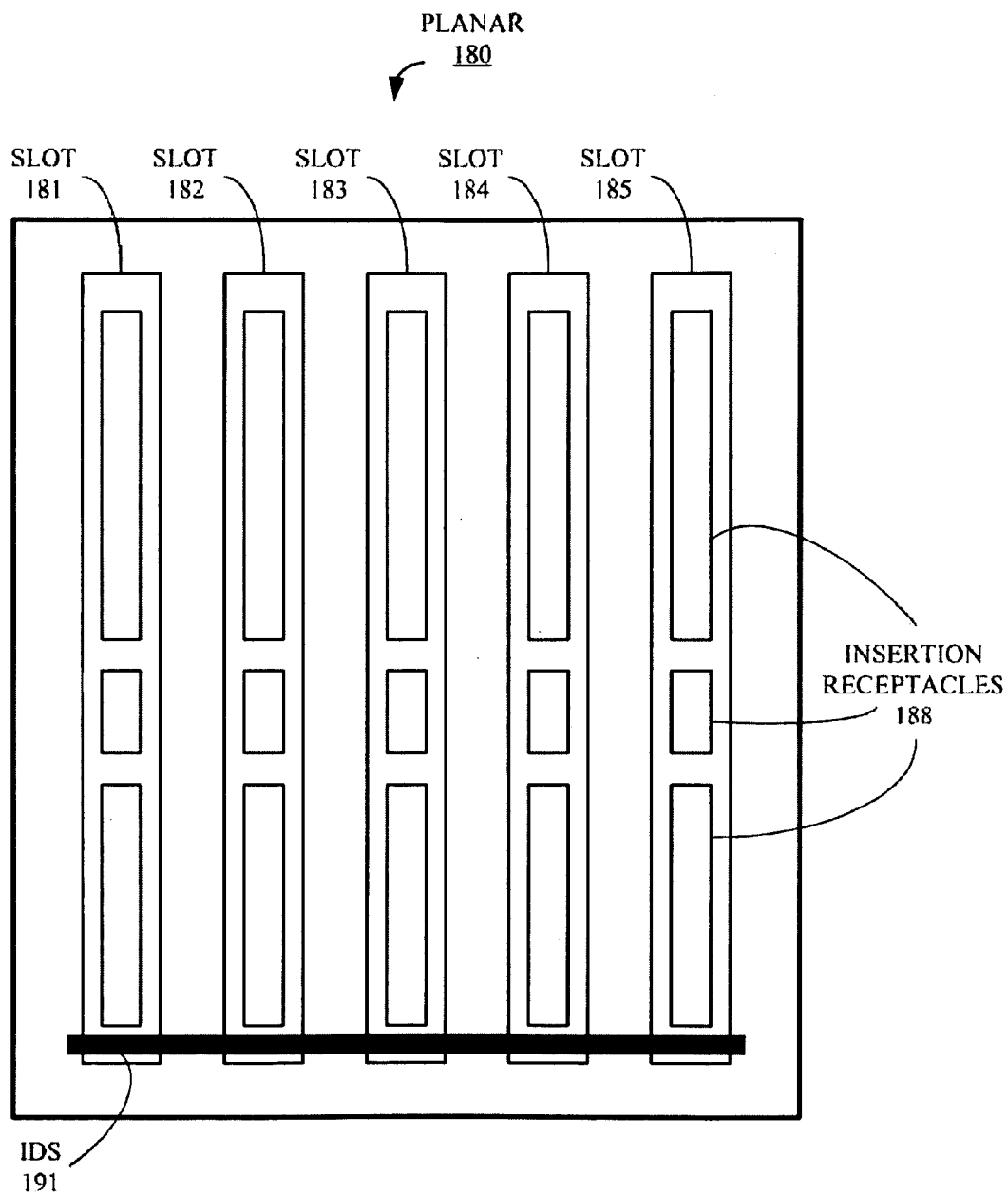
FIG. 5 is a block diagram of a second embodiment of a planar device that incorporates the claimed subject matter.

FIG. 5 is a block diagram of a third embodiment of a planar 180 that incorporates the claimed subject matter. Like planar 160 (FIG. 4), planar 180 includes five (5) slots 181-185, each of which include insertion receptacles 188, into which tabs along one edge of an expansion card would fit. Planar 180 may be installed in any suitable computing device such as server 120 or server 124. Unlike planar 160, planar 180 includes only one IDS 191, which transmits a signal whenever an expansion card is inserted into or removed from any of slots 181-185. Like IDSs 171-175, IDS 191 is referred to as a "switch" only for the sake of convenience, i.e. IDS 191 may be any device such as, but not limited to, a button or sensor that provided the needed functionality.

Figure 6:
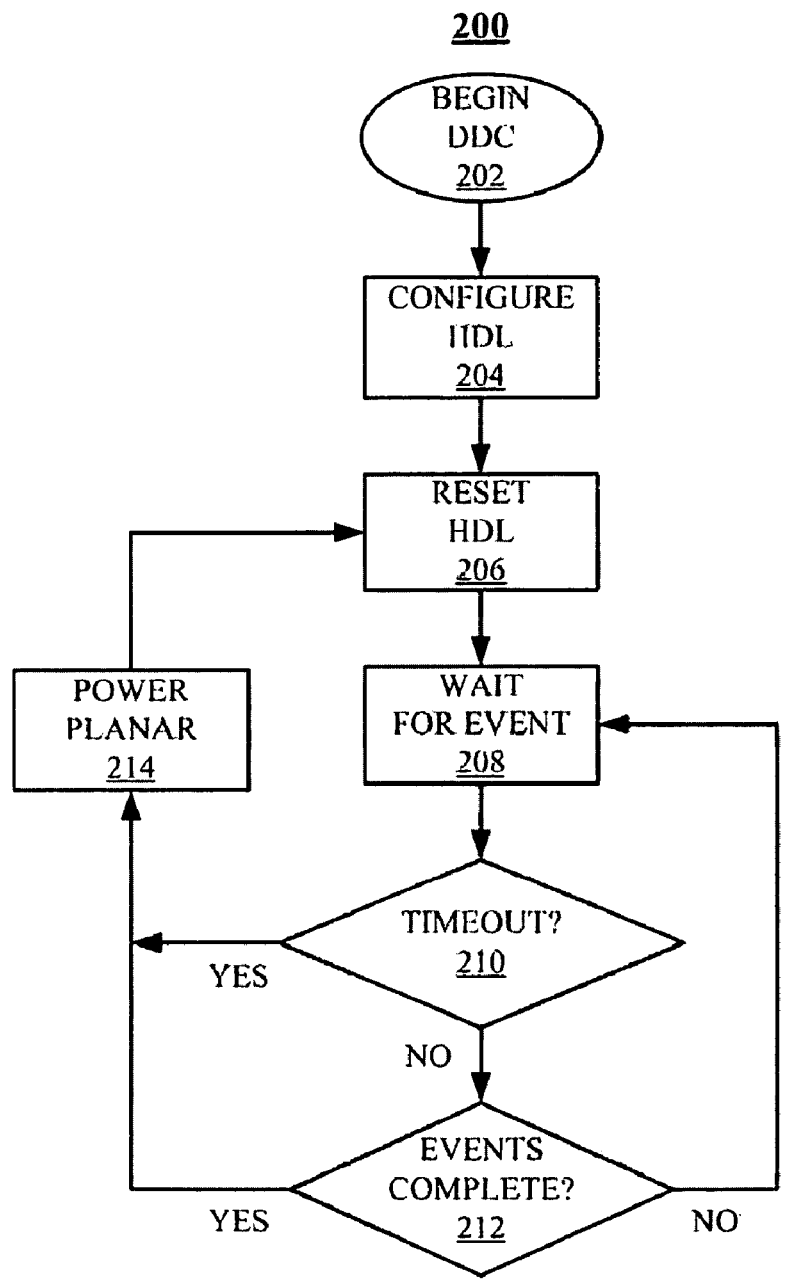
FIG. 6 is a flowchart of a Detect Device Change process associated with the planar devices of FIGS. 4 and 5.
Figure 6:
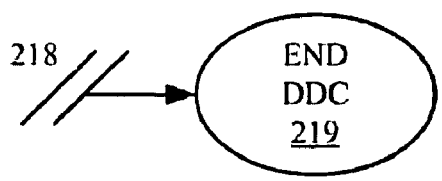

FIG. 6 is a flowchart of a Detect Device Change (DDC) process 200 associated with planar devices 160 and 180, respectively, of FIGS. 4 and 5. In this example, process 200 is stored as part of HDL Control module 156 (FIG. 3) of HDL 150 (FIG. 3) and is described with respect to planar 160. In addition, this example is described as operating on server 120 (FIG. 2).

Process 200 starts in a "Begin DDC" block 202 and proceeds immediately to a "Configure HDL" block 204. During block 204, process 200 retrieves configuration information from configuration module 154 (FIG. 3) and initializes operational parameters that control HDL 150. Such parameters may include, but are not limited to, data communication channels employed by I/O module 152 (FIG. 3) and timeout values associated with various wait periods, explained below. As explained above in conjunction with FIG. 3, the configuration information controls the operation of HDL 150 as well as process 200. During a "Reset HDL" block 206, process 200 initializes operation parameters that are set during operation of HDL 150. Examples of such parameters include, but are not limited to, status variables indicating a stage at which process 200 is currently executing and semaphores for determining a number of expansion cards that are currently in the process of being added or changed.

During a "Wait for Event" block 208, process 200 is suspended while waiting for a targeted event such as the removal of an expansion card from planar 160. Such an event is triggered by the either the depression of release of one of IDSs 171-175 (FIG. 3). Of course, other relevant events that would be expected to accompany the changing of an expansion card may also be detected, such as a power down associated with planar 160 and various timeout values described below. During a "Timeout?" block 210, process 200 determines whether or not control has passed as the result of an insertion/deletion event associated with planar 160 or a timeout.

The length of a particular timeout is set by configurable parameters stored in conjunction with configuration module 154 and loaded during block 204. In addition, there are different timeout parameters depending upon the status of the processing and the specific configuration of HDL 150. For example, there might be one time out value associated with HDL 150 if configured for single card insertion and deletion events (see FIG. 4) and a different timeout value if configured for multiple insertion/deletion events (see FIG. 5). Further, if the status of process 200 indicates that there are no pending insertion/deletion events, the timeout parameter may be set so that a timeout is not triggered regardless of the length of time.

If process 200 determines block 210 was not entered as the result of a timeout, control proceeds to an "Events Complete?" block 212. During block 212, process 200 determines whether or not the event detected during block 208 represents the completion of ongoing insertion/removal events. This determination depends upon configuration options such as whether HDL 150 is configured for multiple, concurrent insertions and deletions and the values of related semaphores or, for example, a single insertion has followed a single card removal. If process 200 determines that the ongoing insertion/removal events are not complete, control returns to Wait for Event block 208 and processing continues as described above.

If, during block 210, process 200 determines that control has passed as the result of a timeout, or, if, during block 212, process 200 determines that the ongoing insertion/removal events are complete, control proceeds to a "Power Planar" block 214. During block 214, planar 160 is powered on long enough for hypervisor 114 (FIG. 1) associated with server 120 to detect the changes to planar 160 and update tables and registries of system contents accordingly. In addition, hypervisor 114 is configured to signal HDL 150 that the reconfiguration is complete so that HDL 150 can discontinue power to planar 160.

Finally, process 200 is halted by means of an interrupt 218, which passes control to an "End DDC Process" block 219 in which process 200 is complete. Interrupt 218 is typically generated when the computing system of which process 200 is a part is itself halted. During nominal operation, process 200 continuously loops through the blocks 206, 208, 210, 212 and 214 processing planar events as generated.

In an alternative embodiment, rather than HDL 150, process 200 is stored and executed by bus controller 138 (FIG. 2) in conjunction with HDL 142 (FIG. 2). In this scenario rather than events detected during block 208 being generated by IDSs 171-175, the events are triggered by logical presence detect pins (not shown) associated with an I/O bus 128 (FIG. 2). Thus, rather than a switch actuated by the removal and insertion of a card, a presence detect function of I/O bus 128 generates the change notification signal. Further, in the alternative, a HDL 142 may detect the physical presence of a card by employing an unused pin in a slot.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

We claim:

1. A method for installing a computing card into a planar device, comprising:
   detecting a removal of a first computing card from a particular position of a planar device;
   detecting insertion of a second computing card into the particular position of the planar device;
   pausing for a period of time to ensure that the second computing card is fully inserted into the planar device;
   providing power, after the pausing, to the planar device in response to the detecting of the insertion of the second computing card;
   detecting, by a hypervisor the power at the planar device; and
   updating tables and registries of system contents, in response to the detection of the power, in conformity with the removal of the first computing card and the insertion of the second computing card.

2. The method of claim 1, wherein the detecting of the insertion and the detecting of the removal are triggered by a switch coupled to the particular position of the planar device.

3. The method of claim 1, wherein the detecting of the insertion and the detecting of the removal are triggered by a signal from a logical presence detect pin associated with a data bus.

4. The method of claim 2, wherein the switch is a mechanical device.

5. The method of claim 2, wherein the switch is an optical device.

6. A system that automatically detects the installation of a computing card into a planar device, comprising:
   a processor;
   a planar device communicatively coupled to the processor;
   memory, coupled to the processor; and
   logic, stored on the memory and executed on the processor, for:
      detecting a removal of a first computing card from a particular position of a planar device;
      detecting insertion of a second computing card into the particular position of the planar device;
      pausing for a period of time to ensure that the second computing card is fully inserted into the planar device;
      providing power, after the pausing, to the planar device in response to the detecting of the insertion of the second computing card;
      detecting, by a hypervisor, the power at the planar device; and
      updating tables and registries of system contents, in response to the detection of the power, in conformity with the removal of the first computing card and insertion of the second computing card.

7. The system of claim 6, wherein the detecting of the insertion and the detecting of the removal are triggered by a switch coupled to the particular position of the planar device.

8. The system of claim 6, wherein the detecting of the insertion and the detecting of the removal are triggered by a signal from a logical presence detect pin associated with a data bus.

9. The system of claim 7, wherein the switch is a mechanical device.

10. The system of claim 7, wherein the switch is an optical device.

11. A computer programming product that automatically detects the installation of a computing card into a planar device, comprising:
    a memory; and
    logic, stored on the memory and executed on a processor, for:
       detecting a removal of a first computing card from a particular position of a planar device;
       detecting insertion of a second computing card into the particular position of the planar device;
       pausing for a period of time to ensure that the second computing card is fully inserted into the planar device;
       providing power, after the pausing, to the planar device in response to the detecting of the insertion of the second computing card;
       detecting, by a hypervisor, the power at the planar device; and
       updating tables and registries of system contents, in response to the detection of the power, in conformity with removal of the first computing card and the insertion of the second computing card.

12. The computer programming product of claim 11, wherein the detecting of the insertion and the detecting of the removal are triggered by a switch coupled to the particular position of the planar device.

13. The computer programming product of claim 11, wherein the detecting of the insertion and the detecting of the removal are triggered by a signal from a logical presence detect pin associated with a data bus.

14. The computer programming product of claim 12, wherein the switch is a mechanical device.

15. A method for installing a computing card into a planar device, comprising:
    detecting insertion of a computing card into a particular position of a planar device;
    pausing for a period of time to ensure that the computing card is fully inserted into the planar device;
    providing power, after the pausing, to the planar device in response to the detecting of the insertion of the computing card;
    detecting, by a hypervisor associated with the computing device, the power at the planar device;
    updating tables and registries of system contents, in response to the detection of the power, in conformity with the insertion of the computing card;
    receiving a signal indicating the updating of the tables and registries of system contents; and
    discontinuing the power provided to the planar device in response to the signal.

16. The method of claim 15, wherein the detecting of the insertion is triggered by a switch coupled to the particular position of the planar device.

17. The method of claim 15, wherein the detecting of the insertion is triggered by a signal from a logical presence detect pin associated with a data bus.

18. The method of claim 16, wherein the switch is a mechanical device.

19. The method of claim 16, wherein the switch is an optical device.

20. A system that automatically detects the installation of a computing card into a planar device, comprising:
- a processor;
- a planar device communicatively coupled to the processor;
- memory, coupled to the processor; and
- logic, stored on the memory and executed on the processor, for:
  - detecting insertion of a computing card into a particular position of a the planar device;
  - pausing for a period of time to ensure that the computing card is fully inserted into the planar device;
  - providing power, after the pausing, to the planar device in response to the detecting of the insertion of the computing card;
  - detecting, by a hypervisor, the power at the planar device;
  - updating tables and registries of system contents, in response to the detection of the power, in conformity with the insertion of the computing card;
  - receiving a signal indicating the updating of the tables and registries of system contents; and
  - discontinuing the power provided to the planar device in response to the signal.

21. The system of claim 20, wherein the detecting of the insertion is triggered by a switch coupled to the particular position of the planar device.

22. The system of claim 20, wherein the detecting of the insertion is triggered by a signal from a logical presence detect pin associated with a data bus.

23. The system of claim 21, wherein the switch is a mechanical device.

24. The system of claim 21, wherein the switch is an optical device.

25. A computer programming product that automatically detects the installation of a computing card into a planar device, comprising:
- a memory; and
- logic, stored on the memory and executed on a processor, for:
  - detecting insertion of a computing card into a particular position of a planar device;
  - pausing for a period of time to ensure that the computing card is fully inserted into the planar device;
  - providing power, after the pausing, to the planar device in response to the detecting of the insertion of the computing card;
  - detecting, by a hypervisor, the power at the planar device;
  - updating tables and registries of system contents, in response to the detection of the power, in conformity with the insertion of the computing card;
  - receiving a signal indicating the updating of the tables and registries of system contents; and
  - discontinuing the power provided to the planar device in response to the signal.

26. The computer programming product of claim 25, wherein the detecting of the insertion is triggered by a switch coupled to the particular position of the planar device.

27. The computer programming product of claim 26, wherein the switch is a mechanical device.

28. The computer programming product of claim 26, wherein the detecting of the insertion is triggered by a signal from a logical presence detect pin associated with a data bus.

* * * * *